US012634436B2

(12) United States Patent
Heo et al.

(10) Patent No.: US 12,634,436 B2
(45) Date of Patent: May 19, 2026

(54) VIDEO ENCODING/DECODING METHOD AND APPARATUS ADJUSTING NUMBER OF MULTIPLE TRANSFORM SELECTION CANDIDATES IN MULTIPLE TRANSFORM SELECTION

(71) Applicants: Hyundai Motor Company, Seoul (KR); Kia Corporation, Seoul (KR)

(72) Inventors: Jin Heo, Yongin (KR); Seung Wook Park, Yongin (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/678,384

(22) Filed: May 30, 2024

(65) Prior Publication Data

US 2024/0323349 A1    Sep. 26, 2024

Related U.S. Application Data

(63) Continuation of application No. PCT/KR2022/019543, filed on Dec. 2, 2022.

(30) Foreign Application Priority Data

Dec. 2, 2021    (KR) ........................ 10-2021-0171220
Dec. 1, 2022    (KR) ........................ 10-2022-0166150

(51) Int. Cl.
*H04N 19/105*    (2014.01)
*H04N 19/176*    (2014.01)
*H04N 19/60*    (2014.01)

(52) U.S. Cl.
CPC ......... *H04N 19/105* (2014.11); *H04N 19/176* (2014.11); *H04N 19/60* (2014.11)

(58) Field of Classification Search
None
See application file for complete search history.

(56) References Cited

U.S. PATENT DOCUMENTS

2021/0211727 A1*    7/2021    Salehifar .............. H04N 19/132
2021/0266581 A1    8/2021    Jung et al.
(Continued)

FOREIGN PATENT DOCUMENTS

KR    10-2021-0031754 A    3/2021
KR    10-2021-0046002 A    4/2021
(Continued)

*Primary Examiner* — Chikaodili E Anyikire
(74) *Attorney, Agent, or Firm* — Fox Rothschild LLP

(57) ABSTRACT

A method for decoding a video includes determining, from multiple sets of multiple transform selection candidates, one set of multiple transform selection candidates based on at least one of a number of non-zero coefficients in a current block and a position of a last non-zero coefficient in the current block. The method for decoding the video also includes selecting one inverse transform method based on the one set of multiple transform selection candidates. The method for decoding the video further includes generating a residual block of the current block by performing the one inverse transform method on coefficients of the current block, where the multiple sets of multiple transform selection candidates have one or more candidates that correspond to a non-Discrete Cosine Transform 2 (non-DCT 2) inverse transform method.

11 Claims, 20 Drawing Sheets

(56)　　　　　　　　References Cited

U.S. PATENT DOCUMENTS

2022/0210474　A1*　6/2022　Jung ...................... H04N 19/70
2022/0286708　A1*　9/2022　Xiu ........................ H04N 19/70

FOREIGN PATENT DOCUMENTS

KR　　10-2021-0057189　A　　5/2021
WO　　　2021/060905　A1　　4/2021
WO　　　2021/096174　A1　　5/2021

* cited by examiner

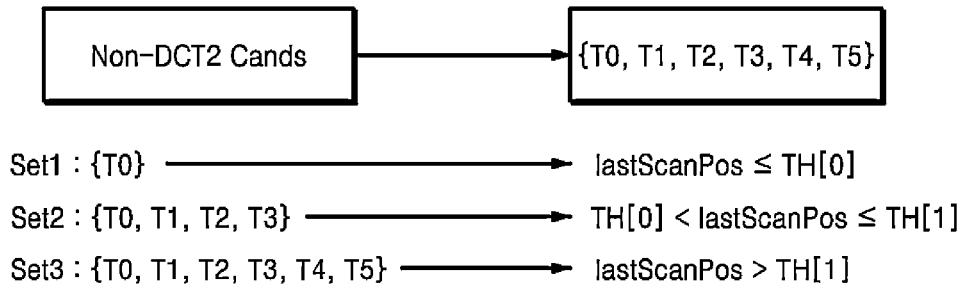
Set1 : {T0} ⟶ lastScanPos ≤ TH[0]
Set2 : {T0, T1, T2, T3} ⟶ TH[0] < lastScanPos ≤ TH[1]
Set3 : {T0, T1, T2, T3, T4, T5} ⟶ lastScanPos > TH[1]
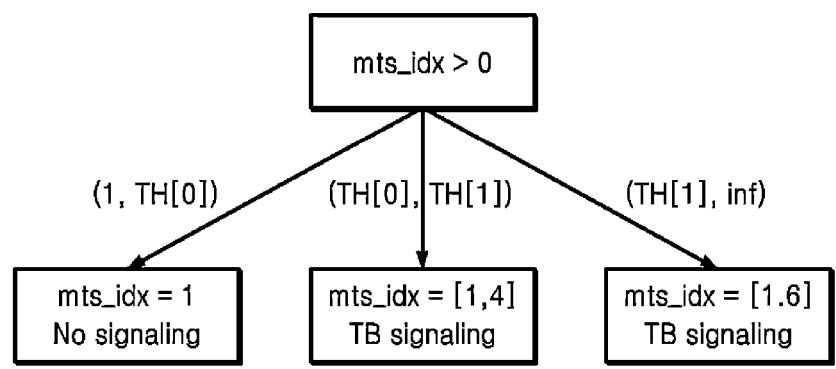
TH[0] = 6, TH[1] = 32
*FIG. 6*

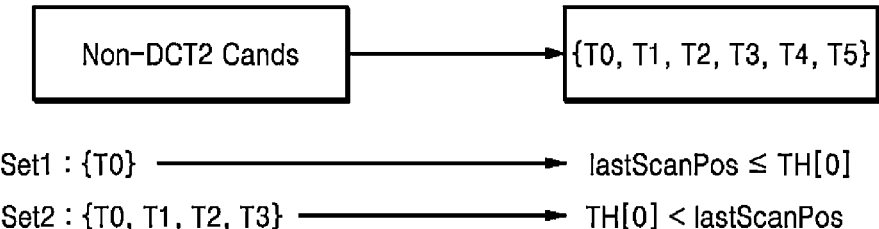
Set1 : {T0} ——————————————→ lastScanPos ≤ TH[0]
Set2 : {T0, T1, T2, T3} ——————→ TH[0] < lastScanPos
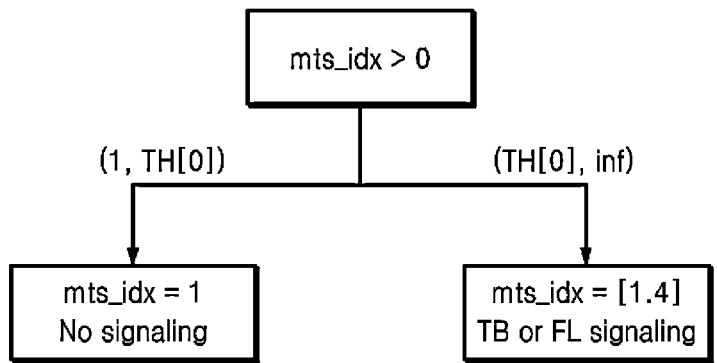
FIG. 7

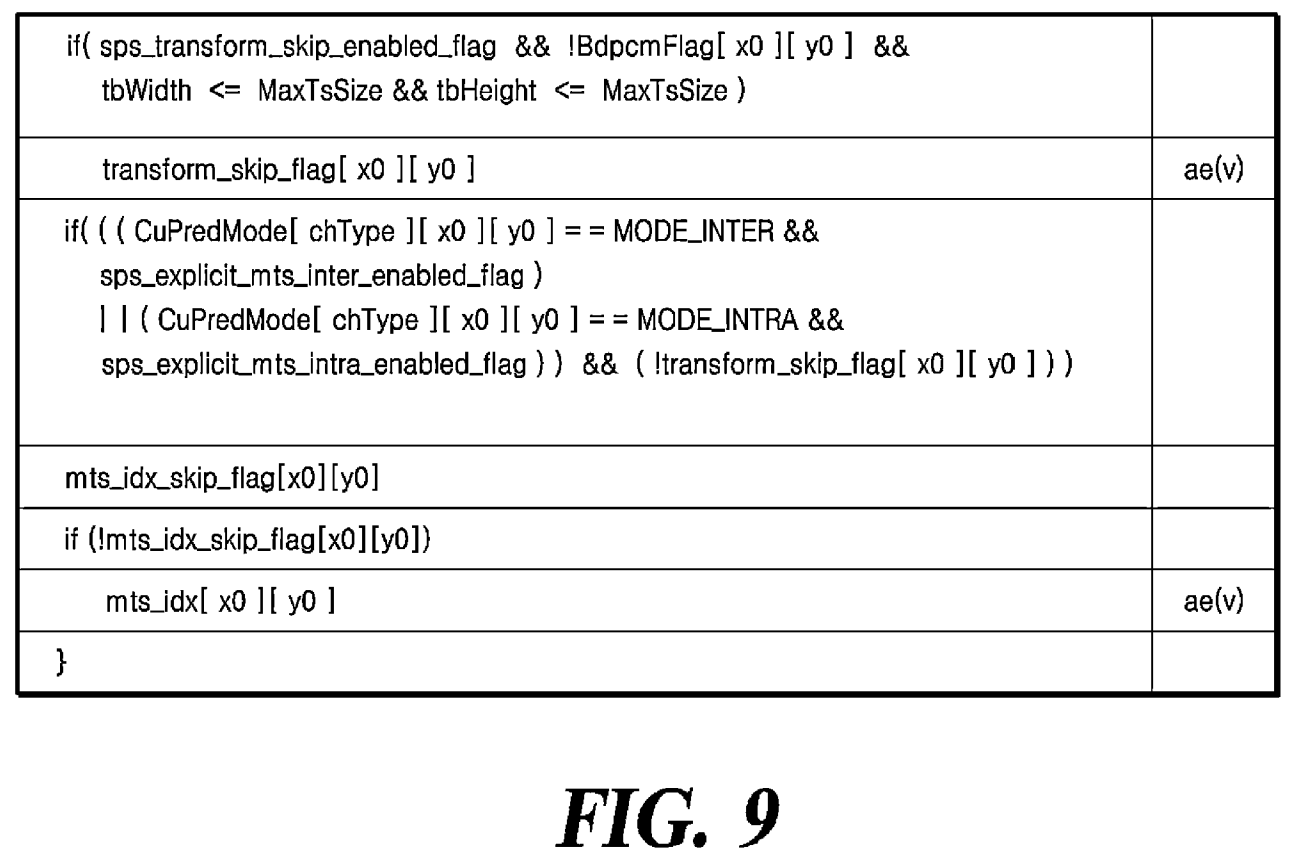

| | |
|---|---|
| if( sps_transform_skip_enabled_flag && !BdpcmFlag[ x0 ][ y0 ] && tbWidth <= MaxTsSize && tbHeight <= MaxTsSize ) | |
| transform_skip_flag[ x0 ][ y0 ] | ae(v) |
| if( ( ( CuPredMode[ chType ][ x0 ][ y0 ] = = MODE_INTER && sps_explicit_mts_inter_enabled_flag ) \| \| ( CuPredMode[ chType ][ x0 ][ y0 ] = = MODE_INTRA && sps_explicit_mts_intra_enabled_flag ) ) && ( !transform_skip_flag[ x0 ][ y0 ] ) ) | |
| mts_idx_skip_flag[x0][y0] | |
| if (!mts_idx_skip_flag[x0][y0]) | |
| mts_idx[ x0 ][ y0 ] | ae(v) |
| } | |

*FIG. 9*

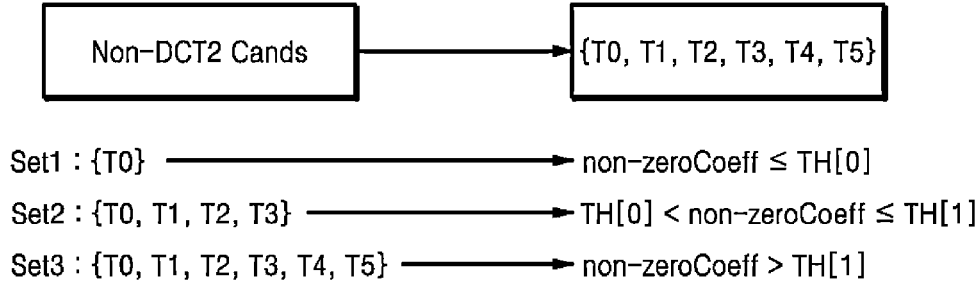
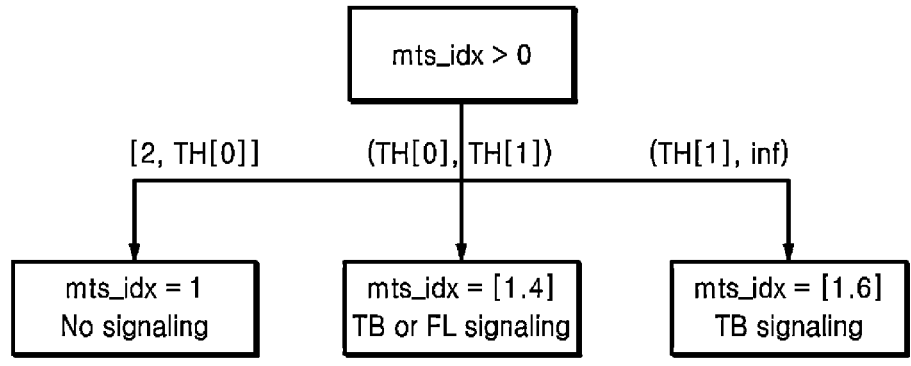
FIG. 10

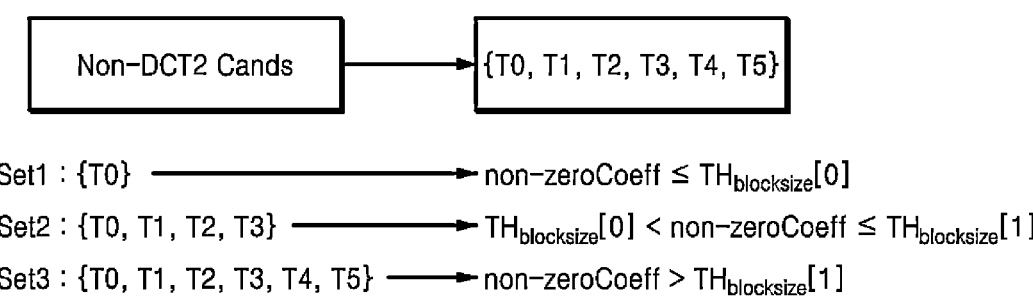
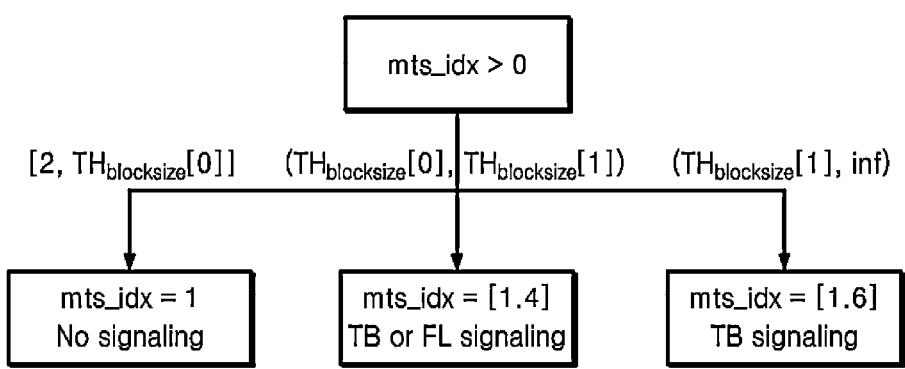
FIG. 11

| | Method 1 | Method 2 |
|---|---|---|
| If((non−zeroCoeff $\leq$ TH$_{\text{non-zeroCoeff}}$[0]) && (lastScanPos > TH$_{\text{lastScanPos}}$[1]) | Set1 | Set3 |
| If((non−zeroCoeff > TH$_{\text{non-zeroCoeff}}$[1]) && (lastScanPos $\leq$ TH$_{\text{lastScanPos}}$[0]) | Set3 | Set1 |

FIG. 13

Non-DCT2 Cands → {T0, T1, T2, T3, T4, T5}

Set1 : {T0} ──── (non-zeroCoeff ≤ TH$_{non-zeroCoeff}$[0]) && (lastScanPos ≤ TH$_{lastScanPos}$[0])

Set2 : {T0, T1, T2, T3} ──── When Not Satisfying Set1 And Set3 Conditions

Set3 : {T0, T1, T2, T3, T4, T5} ──── (non-zeroCoeff > TH$_{non-zeroCoeff}$[1]) && (lastScanPos > TH$_{lastScanPos}$[1])

mts_idx > 0

Set1 → mts_idx = 1
No signaling

Set2 → mts_idx = [1.4]
TB or FL signaling

Set3 → mts_idx = [1.6]
TB signaling

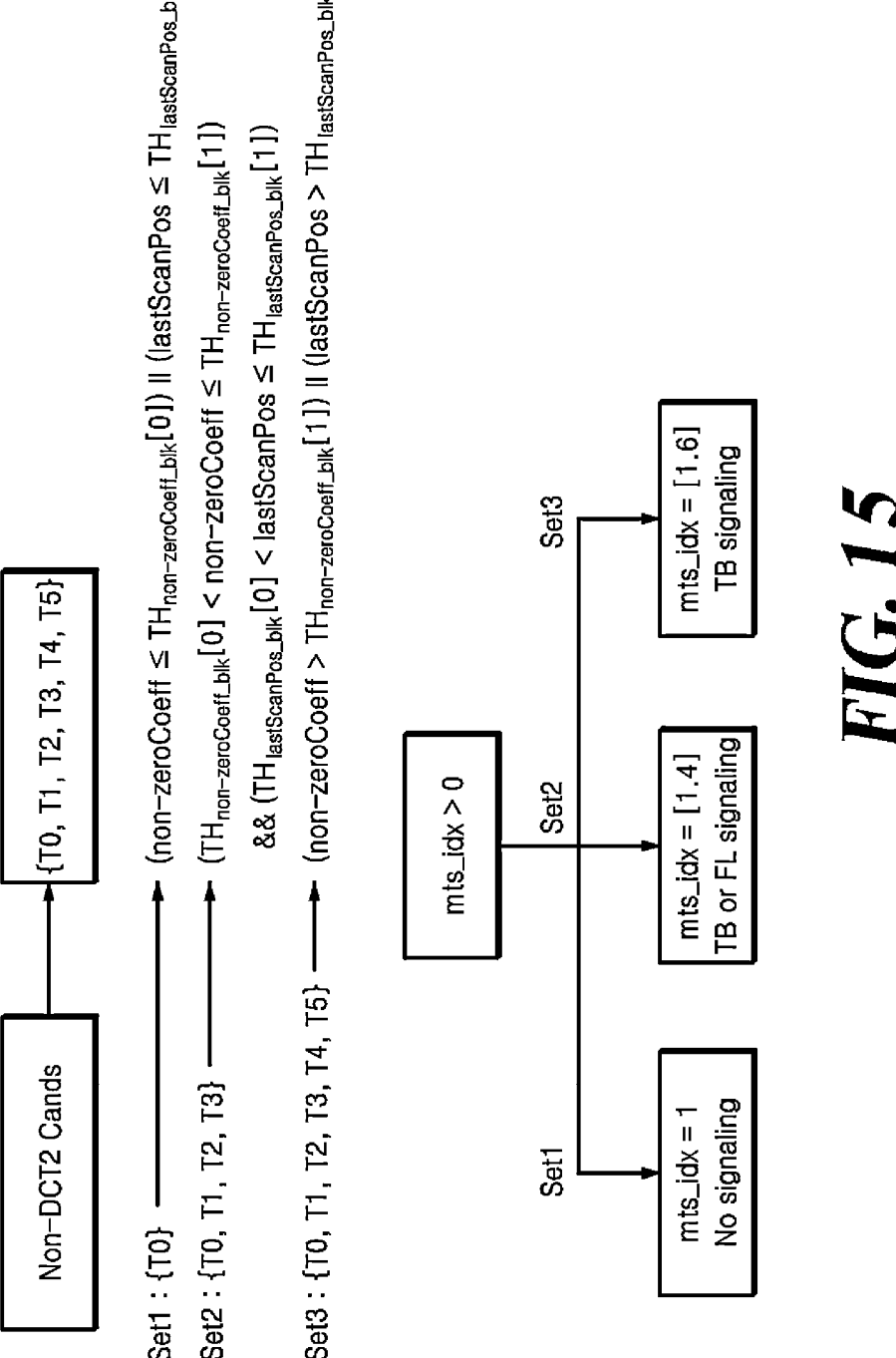

$\text{Set1} : \{T0\}$    $(\text{non-zeroCoeff} \le TH_{\text{non-zeroCoeff\_blk}}[0]) \parallel (\text{lastScanPos} \le TH_{\text{lastScanPos\_blk}}[0])$ $\text{Set2} : \{T0, T1, T2, T3\}$    $(TH_{\text{non-zeroCoeff\_blk}}[0] < \text{non-zeroCoeff} \le TH_{\text{non-zeroCoeff\_blk}}[1])$
$\&\& \ (TH_{\text{lastScanPos\_blk}}[0] < \text{lastScanPos} \le TH_{\text{lastScanPos\_blk}}[1])$ $\text{Set3} : \{T0, T1, T2, T3, T4, T5\}$    $(\text{non-zeroCoeff} > TH_{\text{non-zeroCoeff\_blk}}[1]) \parallel (\text{lastScanPos} > TH_{\text{lastScanPos\_blk}}[1])$

*FIG. 15*

|  | Method 1 | Method 2 |
|---|---|---|
| If((non−zeroCoeff $\leq$ TH$_{\text{non−zeroCoeff\_blk}}$[0]) && (lastScanPos > TH$_{\text{lastScanPos\_blk}}$[1]) | Set1 | Set3 |
| If((non−zeroCoeff > TH$_{\text{non−zeroCoeff\_blk}}$[1]) && (lastScanPos $\leq$ TH$_{\text{lastScanPos\_blk}}$[0]) | Set3 | Set1 |

FIG. 16

VIDEO ENCODING/DECODING METHOD AND APPARATUS ADJUSTING NUMBER OF MULTIPLE TRANSFORM SELECTION CANDIDATES IN MULTIPLE TRANSFORM SELECTION

CROSS-REFERENCE TO RELATED APPLICATIONS

This application is a continuation of International Application No. PCT/KR2022/019543, filed on Dec. 2, 2022, which claims under 35 U.S.C. § 119(a) the benefit of Korean Patent Application No. 10-2021-0171220 filed on Dec. 2, 2021, and Korean Patent Application No. 10-2022-0166150 filed on Dec. 1, 2022, the entire contents of each of which are incorporated herein by reference.

BACKGROUND

(a) Technical Field

The present disclosure in some embodiments relates to a video encoding/decoding method and a video encoding/decoding apparatus for adjusting the number of Multiple Transform Selection (MTS) candidates in Multiple Transform Selection, more particularly, to the video encoding/decoding method and the video encoding/decoding apparatus for variably adjusting the number of MTS candidates by using a position of a last non-zero coefficient within a current block and a number of non-zero coefficients.

(b) Description of the Related Art

The contents described below simply provide background information related to the present embodiment and do not constitute prior art.

Since the volume of video data is larger than the volume of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video include H.264/AVC, high efficiency video coding (HEVC), and versatile video coding (VVC), which improves coding efficiency by about 30% or more compared to HEVC.

However, the video size, resolution, and frame rate are gradually increasing, and thus the amount of data to be encoded is also increasing. Accordingly, a new compression technique having better encoding efficiency and higher image quality than the existing compression technique is required.

The method of Multiple Transform Selection (MTS) utilizes four multiple transform selection candidates in addition to Discrete Cosine Transform 2 (DCT2) regardless of the characteristics of the residual signal in the current block. If the residual signal in the block to be encoded has low energy or has a small number of non-zero coefficients, utilizing four multiple transform selection candidates may result in wasted bits in transmitting or parsing the transform information of that block. Whereas, if the residual signal in the block to be encoded has large energy or has a large number of non-zero coefficients, utilizing the four multiple transform selection candidates may reduce the coding efficiency due to the small number of transform candidates.

Therefore, there is a need for variably adjusting the number of multiple transform selection candidates.

SUMMARY

An object of the present disclosure is to provide a method and apparatus for variably adjusting a number of multiple transform candidates based on a position of a last non-zero coefficient in a current block.

Another object of the present disclosure is to provide a method and apparatus for variably adjusting the number of multiple transform candidates based on a number of non-zero coefficients in the current block.

Another object of the present disclosure is to provide a method and apparatus for variably adjusting the number of multiple transform candidates based on the position of the last non-zero coefficient in the current block and the number of non-zero coefficients in the current block.

Another object of the present disclosure is to provide a method and apparatus for improving video encoding/decoding efficiency.

Another object of the present disclosure is to provide a recording medium storing a bitstream generated by a video encoding/decoding method or a video encoding/decoding apparatus of the present disclosure.

Another object of the present disclosure is to provide a method for transmitting a bitstream generated by a video encoding/decoding method or an apparatus of the present disclosure.

According to a present disclosure, a video decoding method comprising: determining, from multiple sets of multiple transform selection candidates, one set of multiple transform selection candidates based on at least one of a number of non-zero coefficients in a current block and the position of the last non-zero coefficient in the current block, selecting one inverse transform method based on the one set of multiple transform selection candidates, and generating a residual block of the current block by performing the one inverse transform method on coefficients of the current block, wherein the multiple sets of multiple transform selection candidates have one or more candidates that correspond to a non-Discrete Cosine Transform 2 (non-DCT 2) inverse transform method.

According to the present disclosure, a video encoding method comprising: determining, from multiple sets of multiple transform selection candidates, one set of multiple transform selection candidates based on at least one of a number of non-zero coefficients in a current block and the position of the last non-zero coefficient in the current block, selecting one transform method based on the one set of multiple transform selection candidates, obtaining coefficients of the current block by performing the one transform method on a residual block of the current block, and encoding the coefficients of the current block, wherein the multiple sets of multiple transform selection candidates have one or more candidates that correspond to a non-Discrete Cosine Transform 2 (non-DCT 2) transform method.

In addition, according to the present disclosure, it is possible to provide a method of transmitting a bitstream generated by the video encoding method or apparatus according to the present disclosure.

In addition, according to the present disclosure, it is possible to provide a recording medium storing a bitstream generated by the video encoding method or apparatus according to the present disclosure.

In addition, according to the present disclosure, it is possible to provide a recording medium storing a bitstream received and decoded by the video decoding apparatus according to the present disclosure and used to reconstruct a video.

According to the present disclosure, the method and an apparatus for variably adjusting the number of multiple transform candidates based on the position of the last non-zero coefficient in the current block may be provided.

In addition, according to the present disclosure, the method and an apparatus for variably adjusting the number of multiple transform candidates based on the number of non-zero coefficients in the current block may be provided.

In addition, according to the present disclosure, the method and an apparatus for variably adjusting the number of multiple transform candidates based on the position of the last non-zero coefficient in the current block and the number of non-zero coefficients in the current block may be provided.

In addition, according to the present disclosure, the method and an apparatus for improving video encoding/decoding efficiency may be provided.

The effects that may be obtained from the present disclosure are not limited to the effects mentioned above, and other effects not mentioned may be clearly understood by those having ordinary skill in the art from the description below.

BRIEF DESCRIPTION OF THE DRAWINGS

FIG. 6 is a diagram illustrating a method of variably adjusting the number of multiple transform selection candidates based on the position of the last non-zero coefficient in the current block, according to at least one embodiment of the present disclosure.

FIG. 7 is a diagram illustrating a method of variably adjusting the number of multiple transform selection candidates based on the position of the last non-zero coefficient in the current block, according to another embodiment of the present disclosure.

FIG. 9 is a diagram illustrating a syntax structure for deriving mts_idx, according to at least one embodiment of the present disclosure.

FIG. 10 is a diagram illustrating a method of variably adjusting the number of multiple transform selection candidates based on the number of non-zero coefficients in the current block without utilizing the size of the current block, according to at least one embodiment of the present disclosure.

FIG. 11 is a diagram illustrating a method of variably adjusting the number of multiple transform selection candidates based on the number of non-zero coefficients in the current block using the size of the current block, according to at least one embodiment of the present disclosure.

FIG. 13 is a diagram illustrating a method of varying the number of multiple transform selection candidates under the exceptional conditions of FIG. 12, according to at least one embodiment of the present disclosure.

FIG. 15 is a diagram illustrating a method of variably adjusting the number of multiple transform selection candidates based on the position of the last non-zero coefficient in the current block and the number of non-zero coefficients in the current block using the size of the current block, according to at least one embodiment of the present disclosure.

FIG. 16 is a diagram illustrating a method of variably adjusting the number of multiple transform selection candidates under the exceptional conditions of FIG. 15, according to at least one embodiment of the present disclosure.

DETAILED DESCRIPTION

Figure 1:
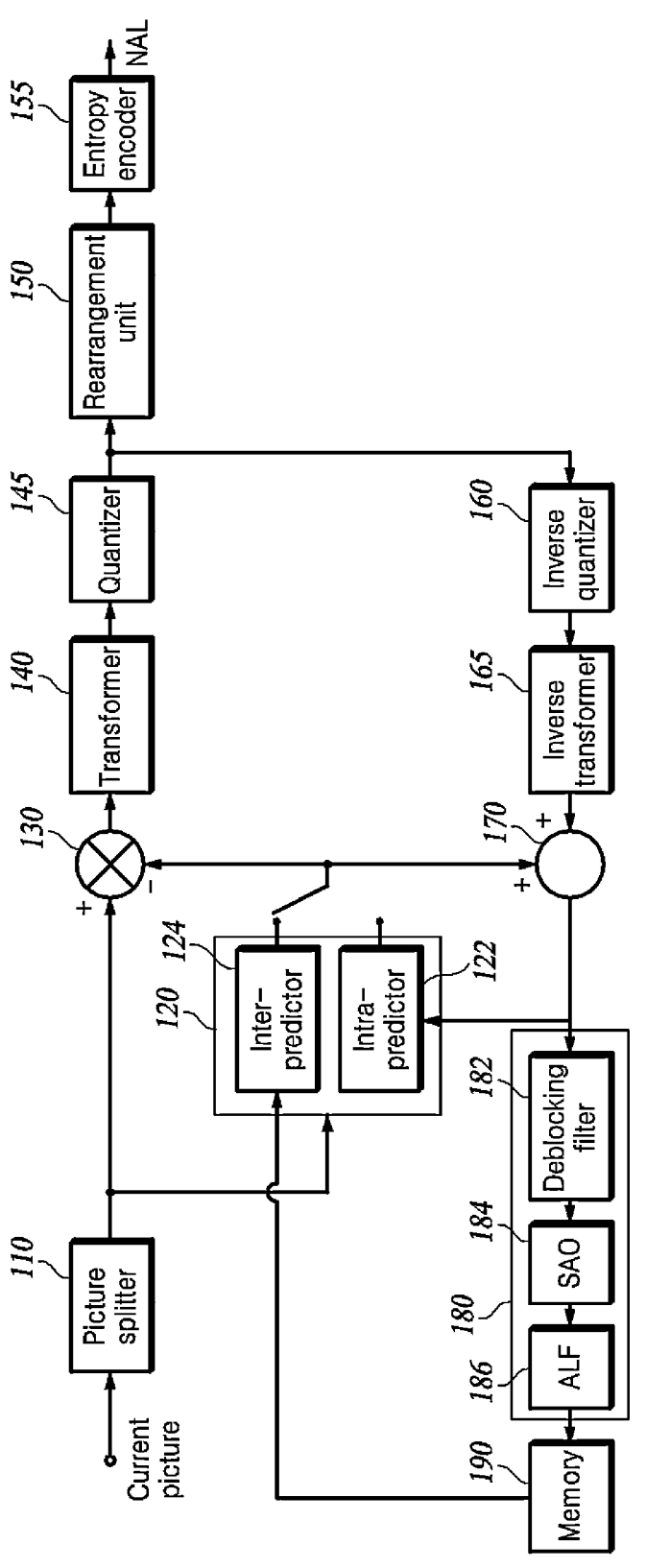
FIG. 1 is a block diagram of a video encoding apparatus that may implement a technology of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binary tree (BT) in which the higher node is split into two lower nodes. The tree structure may also be a ternary tree (TT) in which the higher node is split into three lower nodes at a ratio of 1:2:1. The tree structure may also be a structure in which two or more structures among the QT structure, the BT structure, and the TT structure are mixed. For example, a quadtree plus binary tree (QTBT) structure may be used or a quadtree plus binary tree ternary tree (QTBTTT) structure may be used. Here, a BTTT is added to the tree structures to be referred to as a multiple-type tree (MTT).

Figure 2:
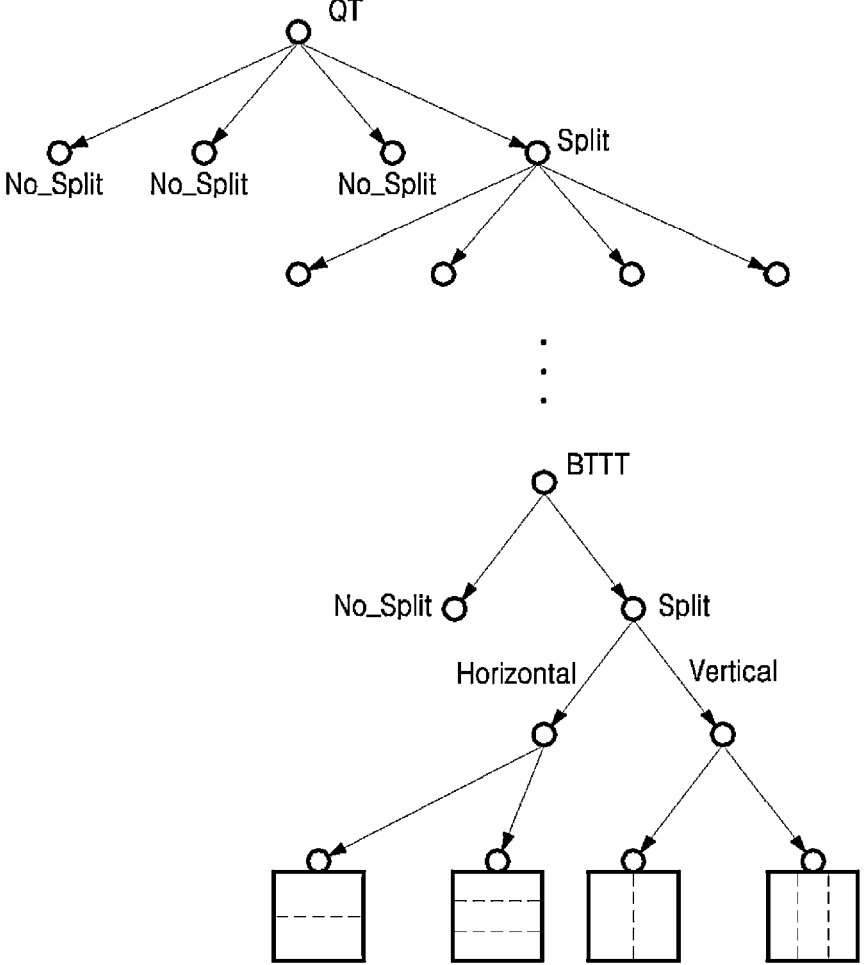
FIG. 2 illustrates a method for partitioning a block using a quadtree plus binary tree ternary tree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
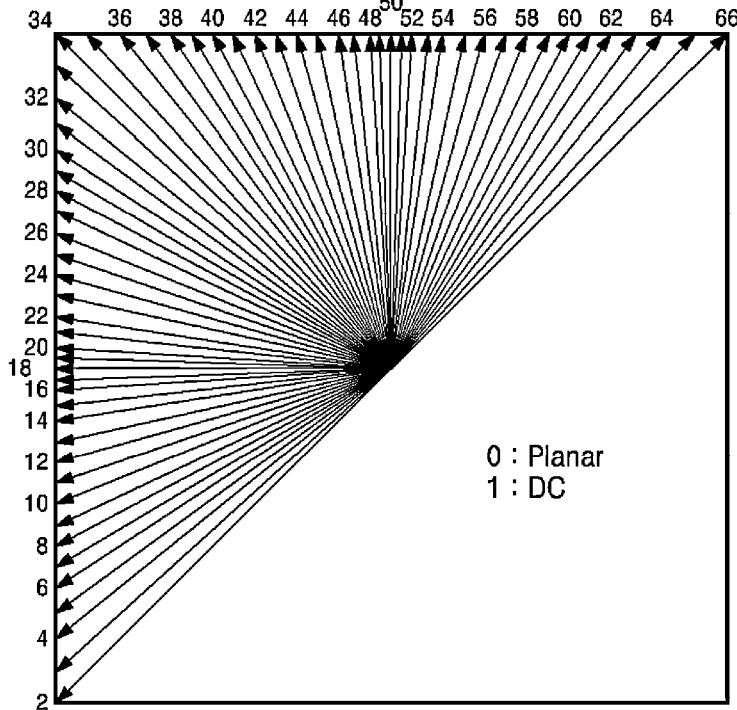
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
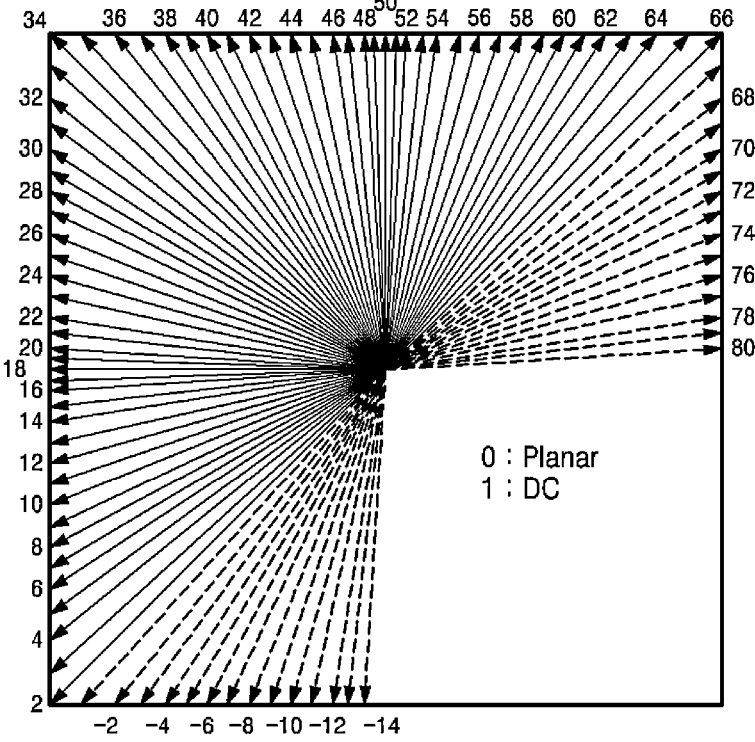

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than-135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
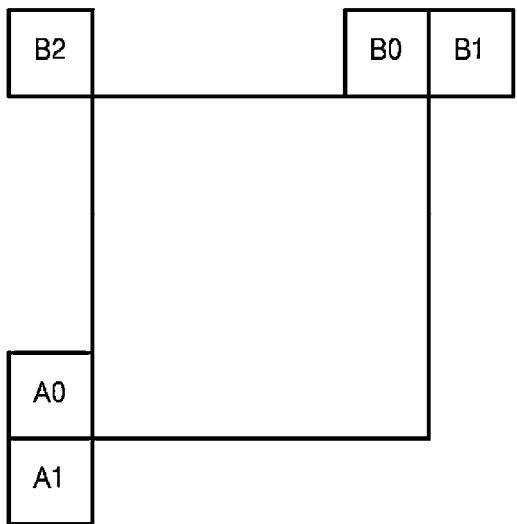
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be obtained by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
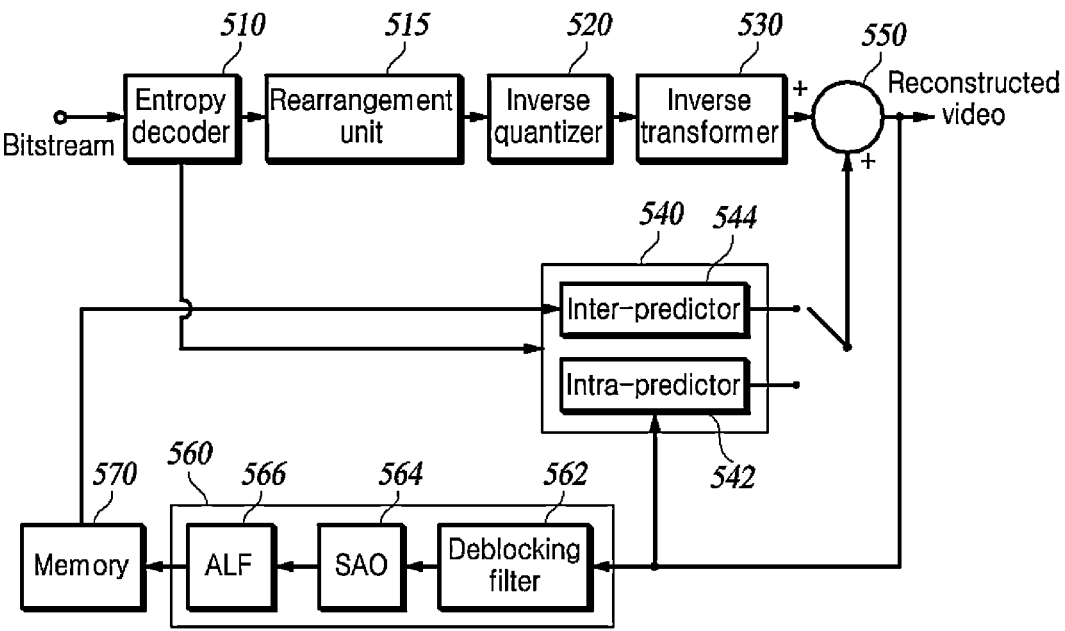
FIG. 5 is a block diagram of a video decoding apparatus that may implement technologies of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer

520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

FIG. 6 is a diagram illustrating a method of variably adjusting the number of multiple transform selection candidates based on the position of the last non-zero coefficient in the current block, according to at least one embodiment of the present disclosure. In Multiple Transform Selection (MTS), the transform pairs for each of multiple transform selection candidates may be determined based on the size of the transform unit and according to the intra-prediction mode. The transform pair for each multiple transform selection candidate may be composed by using the non-Discrete Cosine Transform 2 (DCT2) transform kernel, that is, the Discrete Sine Transform 7 (DST7), DCT8, DCT5, DST4, DST1, and the identity transform. Depending on the scanning order in the current block, a set of three multiple transform selection candidates for the multiple transform selection may be defined based on the position of the last non-zero coefficient within the current block. The sets of multiple transform selection candidates may have different numbers of candidates.

Referring to FIG. 6, if the current block uses a non-DCT2 transform, the information (mts_idx) may have a value greater than zero, indicating the transform kernel applied along the horizontal and vertical directions of the associated luma transform block in the current coding unit. If mts_idx is greater than zero, a suitable set among three sets of multiple transform selection candidates may be selected based on the position of the last non-zero coefficient in the current block. The three sets of multiple transform selection candidates may contain one, four, and six candidates, respectively. Set1 may include a multiple transform candidate T0. Set2 may include multiple transform candidates T0, T1, T2, and T3. Set3 may include multiple transform candidates T0, T1, T2, T3, T4, and T5.

lastScanPos may represent the position of the last non-zero coefficient in the current block. If lastScanPos is between 1 and TH[0], the set of multiple transform selection candidates, Set1, may be used. If lastScanPos is between TH[0] and TH[1], the set of multiple transform selection candidates, Set2, may be used. If lastScanPos is between TH[1] and inf, a Set3 of multiple transform selection candidates may be used. inf may be positive infinity. Here, TH[0] and TH[1] may be the first and second threshold values. TH[0] may be a fixed value of 6, and TH[1] may be a fixed value of 32. Accordingly, the number of multiple transform selection candidates used by the current block may be varied depending on the position of the last non-zero coefficient in the current block. By varying the number of multiple transform selection candidates used by the current block, coding efficiency can be improved.

If the current block uses a single multiple transform selection candidate, mts_idx is 1 and no such transform information needs to be transmitted or parsed. If the current block utilizes four multiple transform selection candidates, mts_idx may be a value between 1 and 4, and such transform information may be transmitted or parsed by using Truncated Binary code (TB code). If the current block uses six multiple transform selection candidates, mts_idx is a value between 1 and 6, and the transform information may be transmitted or parsed by using Truncated Binary code.

FIG. 7 is a diagram illustrating a method of variably adjusting the number of multiple transform selection candidates based on the position of the last non-zero coefficient in the current block, according to another embodiment of the present disclosure. A set of multiple transform selection candidates may include an arbitrary number of multiple transform selection candidates. Using the set of multiple transform selection candidates that includes an arbitrary number of multiple transform selection candidates, the number of multiple transform selection candidates used by the current block may be variably adjusted.

Referring to FIG. 7, lastScanPos may indicate the position of the last non-zero coefficient in the current block. If the current block utilizes a non-DCT2 transform, mts_idx may be greater than zero. Based on the position of the last non-zero coefficient in the current block, a suitable set may be selected from the two sets of multiple transform selection candidates. From among the multiple transform candidates contained in the selected set, a suitable transform may be selected. The transform may be performed by using the selected transform. Based on lastScanPos, the suitable set may be selected from the two sets of multiple transform selection candidates. The two sets of multiple transform selection candidates may include one and four candidates, respectively. Set1 may include a single multiple transform candidate T0. Set2 may include multiple transform candidates T0, T1, T2, and T3.

If lastScanPos is between 1 and TH[0], the set of multiple transform selection candidates, Set1, may be used. If lastScanPos is between TH[0] and inf, the set of multiple transform selection candidates, Set2, may be used. TH[0] is the threshold value and may be an arbitrary value. Any four transform kernel candidates may be used, taking into account the transform kernel mapped to the intra-prediction mode information. If the current block uses the single multiple transform selection candidate, mts_idx is 1 and no such transform information needs to be transmitted or parsed. If the current block uses the four multiple transform selection candidates, mts_idx is a value between 1 and 4, and this transform information may be transmitted or parsed by using truncated binary code or fixed length code (FL).

Figure 8:
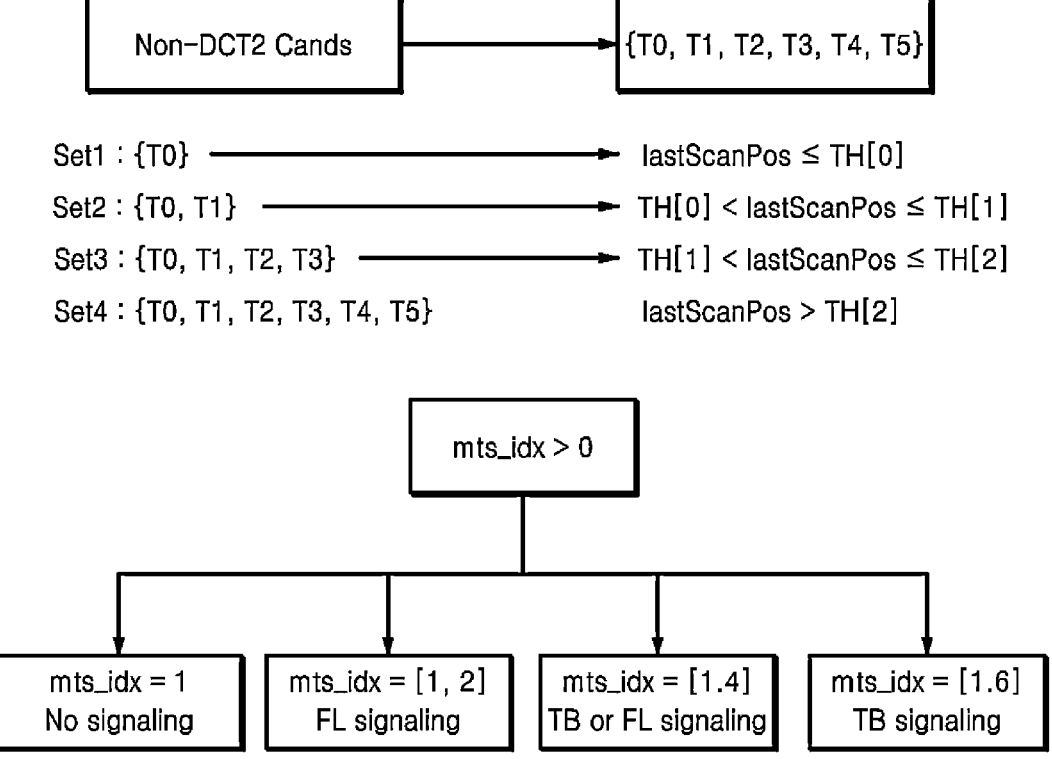
FIG. 8 is a diagram illustrating a method of variably adjusting the number of multiple transform selection candidates based on the position of the last non-zero coefficient in the current block, according to yet another embodiment of the present disclosure.

FIG. 8 is a diagram illustrating a method of variably adjusting the number of multiple transform selection candidates based on the position of the last non-zero coefficient in the current block, according to yet another embodiment of the present disclosure.

Referring to FIG. 8, lastScanPos may represent the position of the last non-zero coefficient in the current block. If the current block utilizes a non-DCT2 transform, mts_idx may be greater than zero. Based on the position of the last non-zero coefficient in the current block, a suitable set may be selected from four sets of multiple transform selection candidates. From among the multiple transform candidates included in the selected set, a suitable transform may be selected. The transform may be performed by using the selected transform. Based on lastScanPos, a suitable set may be selected from the four sets of multiple transform selection candidates. The four sets of multiple transform selection candidates may include one, two, four, and six candidates, respectively. Set1 may include a multiple transform candidate T0. Set2 may include multiple transform candidates T0 and T1. Set3 may include multiple transform candidates T0, T1, T2, and T3. Set4 may include T0, T1, T2, T3, T4, and T5.

If lastScanPos is between 1 and TH[0], the set of multiple transform selection candidates, Set1, may be used. If lastScanPos is between TH[0] and TH[1], the set of multiple transform selection candidates, Set2, may be used. If lastScanPos is between TH[1] and TH[2], the set of multiple transform selection candidates, Set3, may be used. If lastScanPos is between TH[2] and inf, the Set4 set of multiple transform selection candidates may be used. Here, TH[0], TH[1], and TH[2] may be the first threshold value, the second threshold value, and the third threshold value, respectively. TH[0], TH[1], and TH[2] may be arbitrary values.

If the current block uses a single multiple transform selection candidate, mts_idx is 1 and such transform information does not need to be transmitted or parsed. If the current block utilizes two multiple transform selection candidates, mts_idx is either 1 or 2 and such transform information may be transmitted or parsed by using a fixed-length code. If the current block uses four multiple transform selection candidates, mts_idx is a value between 1 and 4, and the transform information may be transmitted or parsed by using truncated binary code or fixed-length code. If the current block utilizes six multiple transform selection candidates, mts_idx is a value between 1 and 6, and the transform information may be transmitted or parsed by using truncated binary code.

For example, in FIGS. 7 and 8, any number of sets of multiple transform selection candidates and any number of threshold values may be used. The numbers of multiple transform selection candidates included in the sets of multiple transform selection candidates may also be defined as arbitrary numbers. The transform pairs of the multiple transform selection candidates may also be determined to be any combination of transforms.

FIG. 9 is a diagram illustrating a syntax structure for deriving mts_idx, according to at least one embodiment of the present disclosure. When transmitting or parsing the mts_idx, the coding efficiency of the residual signal may drop. The mts_idx may be derived by utilizing the mts_idx_skip_flag.

Referring to FIG. 9, if mts_idx_skip_flag is 1, mts_idx may not be transmitted or parsed. In this case, the value of mts_idx may be derived. If mts_idx_skip_flag is 0, mts_idx may be transmitted or parsed. If mts_idx_skip_flag is 1, the value of mts_idx may be derived in the following ways. The position of the last non-zero coefficient in the current block that uses multiple transform selection and the value of the mts_idx used may be accumulated based on the size of the current block. If the mts_idx_skip_flag is 1, the size of the current block and the position of the last non-zero coefficient in the current block may be determined. Among the accumulated mts_idx values, the most used mts_idx value may be derived as the mts_idx value of the current block. By utilizing such a method, bits required to transmit or parse the mts_idx can be saved, thereby improving coding efficiency.

FIG. 10 is a diagram illustrating a method of variably adjusting the number of multiple transform selection candidates based on the number of non-zero coefficients in the current block without utilizing the size of the current block, according to at least one embodiment of the present disclosure. Based on the number of non-zero coefficients in the current block, the number of multiple transform candidates used in the multiple transform selection may be variably adjusted. Without considering the size of the current block, the number of multiple transform candidates used in the multiple transform selection may be variably scaled based on the number of non-zero coefficients in the current block.

Referring to FIG. 10, non-zeroCoeff may be the number of non-zero coefficients in the current block. If the non-zero coefficients in the current block are only DC coefficients or if only one arbitrary AC coefficient is present, only the DCT2 transform may be used. In this case, mts_idx may be 0 and the non-DCT2 transform kernel does not need to be used. Depending on the number of non-zero coefficients in the current block, a suitable set may be selected from three sets of multiple transform selection candidates. From among the multiple transform selection candidates included in the selected set, a suitable transform may be selected. The transform may be performed by using the selected transform. Based on non-zeroCoeff, the suitable set may be selected from the three sets of multiple transform selection candidates. The three sets of multiple transform selection candidates may include one, four, and six candidates, respectively. Set1 may include a multiple transform candidate T0. Set2 may include multiple transform candidates T0, T1, T2, and T3. Set3 may include multiple transform candidates T0, T1, T2, T3, T4, and T5.

If non-zeroCoeff is between 2 and TH[0], the set of multiple transform selection candidates, Set1, may be used. If non-zeroCoeff is between TH[0] and TH[1], the set of multiple transform candidates, Set2, may be used. If non-zeroCoeff is between TH[1] and inf, the set of multiple transform candidates, Set3, may be used. Here, TH[0] and TH[1] may be the first threshold value and the second threshold value, respectively. TH[0] and TH[1] may be set to fixed arbitrary values independent of the size of the current block. The six non-DCT2 transform kernels of T0 through T5 may be arbitrary transform kernels. An arbitrary number of sets of multiple transform selection candidates and an arbitrary number of threshold values may be used. The number of multiple transform selection candidates included in the set of multiple transform selection candidates may also be varied to be an arbitrary number.

If the current block utilizes a single multiple transform selection candidate, then mts_idx is 1 and no such transform information needs to be transmitted or parsed. If the current block utilizes four multiple transform selection candidates, mts_idx is a value between 1 and 4, and such information may be transmitted or parsed by using truncated binary code or fixed-length code. If the current block utilizes six multiple transform selection candidates, mts_idx is a value between 1 and 6, and the transform information may be transmitted or parsed by using truncated binary code.

FIG. 11 is a diagram illustrating a method of variably adjusting the number of multiple transform selection candidates based on the number of non-zero coefficients in the current block using the size of the current block, according to at least one embodiment of the present disclosure. By considering the size of the current block together with the number of non-zero coefficients in the current block, the number of multiple transform candidates used in the multiple transform selection may be variably adjusted. Different threshold values may be used depending on the size of the current block. Different thresholds may be used to select a set of multiple transform selection candidates.

Referring to FIG. 11, non-zeroCoeff may be the number of non-zero coefficients in the current block. If the only non-zero coefficients in the current block are DC coefficients or if only one arbitrary AC coefficient is present, only the DCT2 transform may be used. In this case, mts_idx corresponds to 0 and the non-DCT2 transform kernel does not need to be used. Depending on the number of non-zero coefficients in the current block and different threshold values with the size of the current block considered, a suitable set may be selected from three sets of multiple transform selection candidates. From among the multiple transform selection candidates included in the selected set, a suitable transform may be selected. The transform may be performed by using the selected transform. Based on the non-zeroCoeff and different threshold values that take into account the size of the current block, a suitable set may be selected from the three sets of multiple transform selection candidates. The three sets of multiple transform selection candidates may contain 1, 4, and 6 candidates, respectively. Set1 may include a multiple transform candidate T0. Set2 may include multiple transform candidates T0, T1, T2, and T3. Set3 may include multiple transform candidates T0, T1, T2, T3, T4, and T5. Different thresholds $TH_{blocksize}[0]$ and $TH_{blocksize}[1]$ may be used, taking into account the size of the current block.

If non-zeroCoeff is between 2 and $TH_{blocksize}[0]$, the set of multiple transform selection candidates, Set1, may be used. If non-zeroCoeff is between $TH_{blocksize}[0]$ and $TH_{blocksize}[1]$, the set of multiple transform selection candidates, Set2, may be used. If non-zeroCoeff is between $TH_{blocksize}[1]$ and inf, the set of multiple transform selection candidates, Set3, may be used. Here, $TH_{blocksize}[0]$ and $TH_{blocksize}[1]$ may be the first and second threshold values defined for the corresponding block sizes, respectively. $TH_{blocksize}[0]$ and $TH_{blocksize}[1]$ may be set to arbitrary values with the size of the current block considered. The six non-DCT2 transform kernels of T0 through T5 may be arbitrary transform kernels. An arbitrary number of sets of multiple transform selection candidates and an arbitrary number of threshold values may be used. The numbers of multiple transform selection candidates included in the sets of multiple transform selection candidates may also be varied to be arbitrary numbers.

If the current block utilizes a single multiple transform selection candidate, mts_idx is 1 and such transform information does not need to be transmitted or parsed. If the current block uses four multiple transform selection candidates, mts_idx is a value between 1 and 4, and this transform information may be transmitted or parsed by using truncated binary code or fixed-length code. If the current block utilizes six multiple transform selection candidates, mts_idx is a value between 1 and 6, and the transform information may be transmitted or parsed by using truncated binary code.

The syntax structure of FIG. 9 may be used in the methods described in FIGS. 10 and 11. If mts_idx_skip_flag is equal to one, mts_idx may not be transmitted or parsed. In this case, the value of mts_idx may be derived. If mts_idx_skip_flag is 0, mts_idx may be transmitted or parsed. If mts_idx_skip_flag is 1, the value of mts_idx may be derived in the following ways. The number of non-zero coefficients in the current block that use multiple transform selection and the value of mts_idx used may be accumulated. If the mts_idx_skip_flag is 1, the number of non-zero coefficients in the current block may be determined. Among the accumulated mts_idx values, the most used mts_idx value may be derived as the mts_idx value of the current block. By utilizing such a method, bits required to transmit or parse the MTS_IDX can be saved, thereby improving coding efficiency.

Figure 12:
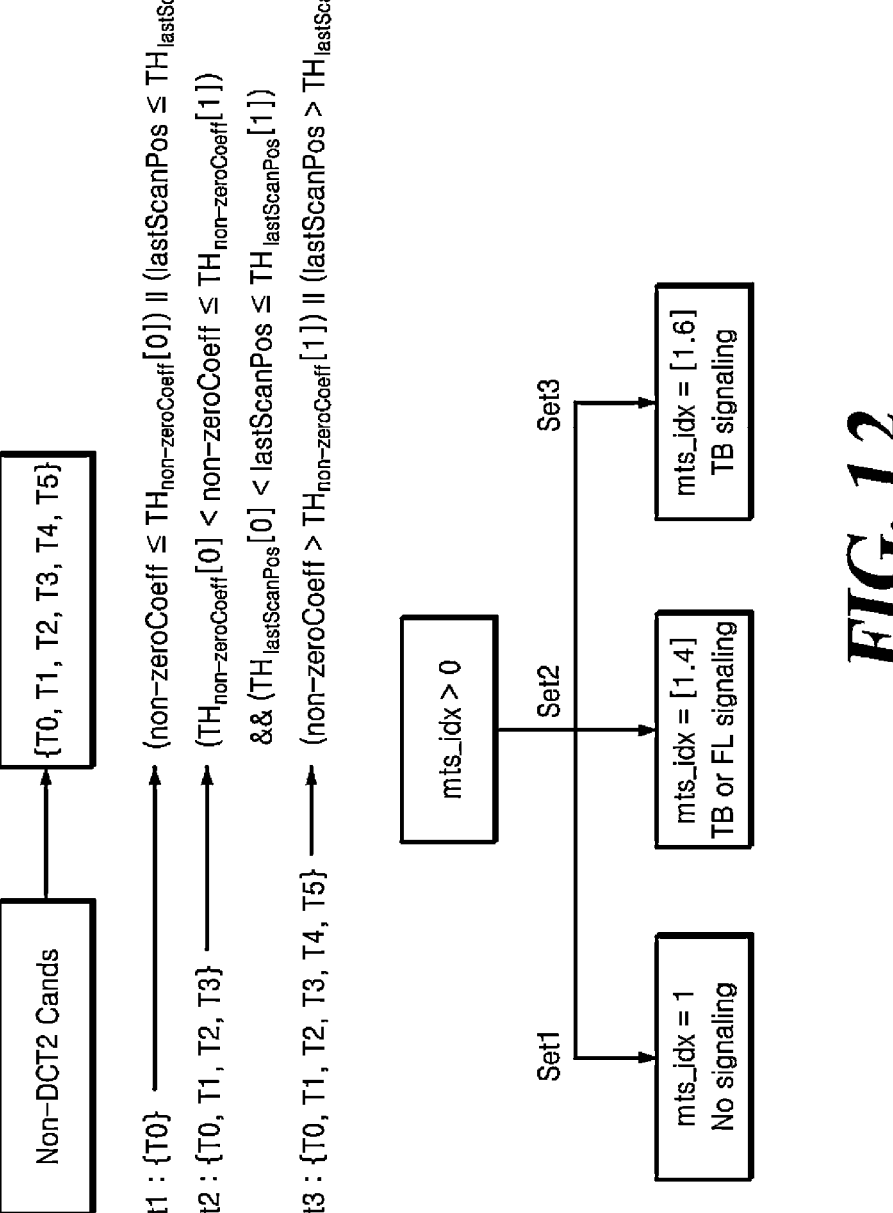
FIG. 12 is a diagram illustrating a method of variably adjusting the number of multiple transform selection candidates based on the position of the last non-zero coefficient in the current block and the number of non-zero coefficients in the current block without utilizing the size of the current block, according to at least one embodiment of the present disclosure.

FIG. 12 is a diagram illustrating a method of variably adjusting the number of multiple transform selection candidates based on the position of the last non-zero coefficient in the current block and the number of non-zero coefficients in the current block without utilizing the size of the current block, according to at least one embodiment of the present disclosure. By considering both the number of non-zero coefficients in the current block and the position of the last non-zero coefficient in the current block, the number of the multiple transform selection candidates for use in the multiple transform selection may be variably adjusted. Without considering the size of the current block, the number of multiple transform candidates used in the multiple transform selection may be variably adjusted based on the position of the last non-zero coefficient in the current block and the number of non-zero coefficients in the current block.

Referring to FIG. 12, lastScanPos may be the position of the last non-zero coefficient in the current block. non-zeroCoeff may be the number of non-zero coefficients in the current block. If the only non-zero coefficients in the current block are DC coefficients or if only one arbitrary AC coefficient is present, only the DCT2 transform may be used. In this case, mts_idx may be 0 and no non-DCT2 transform kernel needs to be used. Depending on the position of the last non-zero coefficient in the current block and the number of non-zero coefficients in the current block, a suitable set may be selected from three sets of multiple transform selection candidates. From among the multiple transform candidates included in the selected set, a suitable transform may be selected. The transform may be performed by using the selected transform. Based on lastScanPos and non-zeroCoeff, the suitable set may be selected from the three sets of multiple transform selection candidates. The three sets of multiple transform selection candidates may include one, four, and six candidates, respectively. Set1 may include a multiple transform candidate T0. Set2 may include multiple transform candidates T0, T1, T2, and T3. Set3 may include multiple transform candidates T0, T1, T2, T3, T4, and T5.

If non-zeroCoeff is between 2 and $TH_{non-zeroCoeff}[0]$ or lastScanPos is between 1 and $TH_{lastScanPos}[0]$, then the set of multiple transform selection candidates, Set1, may be used. If non-zeroCoeff is between $TH_{non-zeroCoeff}[0]$ and $TH_{non-zeroCoeff}[1]$ and lastScanPos is between $TH_{lastScanPos}[0]$ and $TH_{lastScanPos}[1]$, then the set of multiple transform selection candidates, Set2, may be used. If non-zeroCoeff is between $TH_{non-zeroCoeff}[1]$ and inf, or if lastScanPos is between $TH_{lastScanPos}[1]$ and inf, then the set of multiple transform selection candidates, Set3, may be used.

Here, $TH_{non-zeroCoeff}[0]$ and $TH_{non-zeroCoeff}[1]$ may be the first threshold value and the second threshold value of the number of non-zero coefficients in the current block, respectively. $TH_{lastScanPos}[0]$ and $TH_{lastScanPos}[1]$ may be the first threshold value and the second threshold value of the position of the last non-zero coefficient in the current block, respectively. $TH_{non-zeroCoeff}[0]$, $TH_{non-zeroCoeff}[1]$, $TH_{lastScanPos}[0]$, and $TH_{lastScanPos}[1]$ may be set to fixed arbitrary values independent of the size of the current block. The six non-DCT2 transform kernels of T0 through T5 may be arbitrary transform kernels. An arbitrary number of sets of multiple transform selection candidates and an arbitrary number of threshold values may be used. The numbers of multiple transform selection candidates included in the sets of multiple transform selection candidates may also be varied to be arbitrary numbers.

If the current block utilizes a single multiple transform selection candidate, then mts_idx is 1 and no such transform information needs to be transmitted or parsed. If the current block utilizes four multiple transform selection candidates, mts_idx is a value between 1 and 4, and such transform information may be transmitted or parsed by using truncated binary code or fixed-length code. If the current block utilizes six multiple transform selection candidates, mts_idx is a value between 1 and 6, and the transform information may be transmitted or parsed by using truncated binary code.

FIG. 13 is a diagram illustrating a method of varying the number of multiple transform selection candidates under the exceptional conditions of FIG. 12, according to at least one embodiment of the present disclosure.

Referring to FIG. 13, the case of FIG. 12 where non-zeroCoeff is between 2 and $TH_{non-zeroCoeff}[0]$ and lastScan-Pos is between $TH_{lastScanPos}[1]$ and inf may constitute an exceptional condition with a low probability of occurrence. The case of FIG. 12 where non-zeroCoeff is between $TH_{non-zeroCoeff}[1]$ and inf and lastScanPos is between 1 and $TH_{lastScanPos}[0]$ may be an exceptional condition with a low probability of occurrence. Under these exceptional conditions, a set of multiple transform selection candidates may be selected.

In method 1, a set of multiple transform selection candidates may be selected by prioritizing the number of non-zero coefficients in the current block. If non-zeroCoeff is between 2 and $TH_{non-zeroCoeff}[0]$ and lastScanPos is between $TH_{lastScanPos}[1]$ and inf, then the set of multiple transform selection candidates, Set1, may be used. If non-zeroCoeff is between $TH_{non-zeroCoeff}[1]$ and inf and lastScanPos is between 1 and $TH_{lastScanPos}[0]$, then the set of multiple transform selection candidates, Set3, may be used.

In method 2, a set of multiple transform selection candidates may be selected by prioritizing the position of the last non-zero coefficient in the current block. If non-zeroCoeff is between 2 and $TH_{non-zeroCoeff}[0]$ and lastScanPos is between $TH_{lastScanPos}[1]$ and inf, then the set of multiple transform selection candidates, Set3, may be used. If non-zeroCoeff is between $TH_{non-zeroCoeff}[1]$ and inf and lastScanPos is between 1 and $TH_{lastScanPos}[0]$, the set of multiple transform selection candidates, Set1, may be used.

Figure 14:
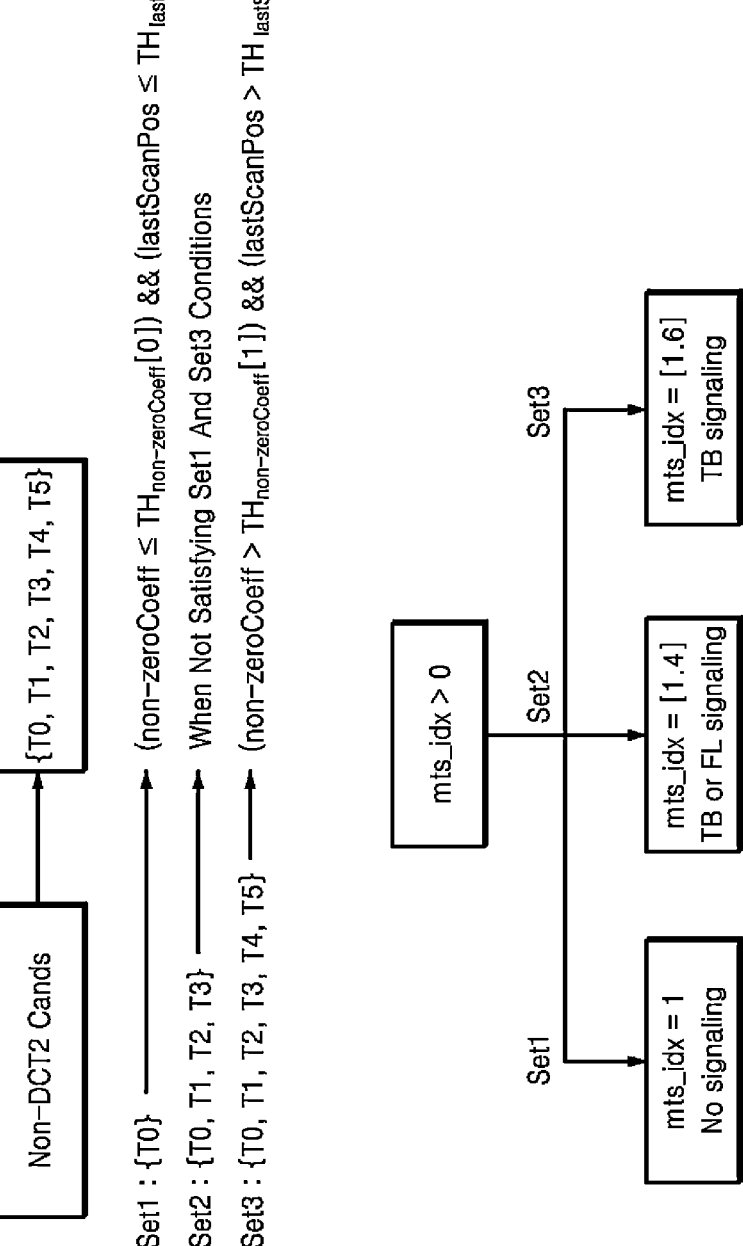
FIG. 14 is a diagram for illustrating a method of variably adjusting the number of multiple transform selection candidates based on the position of the last non-zero coefficient in the current block and the number of non-zero coefficients in the current block without utilizing the size of the current block, according to another embodiment of the present disclosure.

FIG. 14 is a diagram for illustrating a method of variably adjusting the number of multiple transform selection candidates based on the position of the last non-zero coefficient in the current block and the number of non-zero coefficients in the current block without utilizing the size of the current block, according to another embodiment of the present disclosure.

Referring to FIG. 14, lastScanPos may be the position of the last non-zero coefficient in the current block. non-zeroCoeff may be the number of non-zero coefficients in the current block. If the only non-zero coefficients in the current block are DC coefficients or if only one arbitrary AC coefficient is present, only the DCT2 transform may be used. In this case, mts_idx may be 0 and the non-DCT2 transform kernel does not need to be used. Depending on the position of the last non-zero coefficient in the current block and the number of non-zero coefficients in the current block, a suitable set may be selected from three sets of multiple transform selection candidates. From among the multiple transform candidates included in the selected set, a suitable transform may be selected. The transform may be performed by using the selected transform. Based on lastScanPos and non-zeroCoeff, a suitable set may be selected from the three sets of multiple transform selection candidates. The three sets of multiple transform selection candidates may include one, four, and six candidates, respectively. Set1 may include a multiple transform candidate T0. Set2 may include multiple transform candidates T0, T1, T2, and T3. Set3 may include multiple transform candidates T0, T1, T2, T3, T4, and T5.

If non-zeroCoeff is between 2 and $TH_{non-zeroCoeff}[0]$ and lastScanPos is between 1 and $TH_{lastScanPos}[0]$, the set of multiple transform selection candidates, Set1, may be used. If non-zeroCoeff is between $TH_{non\text{-}zeroCoeff}[1]$ and inf and lastScanPos is between $TH_{lastScanPos}[1]$ and inf, then the set of multiple transform selection candidates, Set3, may be used. If the aforementioned conditions for using Set1 and Set3 are not met, the set of multiple transform selection candidates, Set2, may be used.

Here, $TH_{non\text{-}zeroCoeff}[0]$ and $TH_{non\text{-}zeroCoeff}[1]$ may be the first threshold value and the second threshold value of the number of non-zero coefficients in the current block, respectively. $TH_{lastScanPos}[0]$ and $TH_{lastScanPos}[1]$ may be the first threshold value and the second threshold value of the position of the last non-zero coefficient in the current block, respectively. $TH_{non\text{-}zeroCoeff}[0]$, $TH_{non\text{-}zeroCoeff}[1]$, $TH_{lastScanPos}[0]$, and $TH_{lastScanPos}[1]$ may be set to fixed arbitrary values independent of the size of the current block. The six non-DCT2 transform kernels of T0 through T5 may be arbitrary transform kernels. An arbitrary number of sets of multiple transform selection candidates and an arbitrary number of threshold values may be used. The numbers of multiple transform selection candidates included in the sets of multiple transform selection candidates may also be varied to be arbitrary numbers.

If the current block utilizes a single multiple transform selection candidate, then mts_idx is 1 and such transform information does not need to be transmitted or parsed. If the current block utilizes four multiple transform selection candidates, mts_idx is a value between 1 and 4, and such transform information may be transmitted or parsed by using truncated binary code or fixed-length code. If the current block utilizes six multiple transform selection candidates, mts_idx is a value between 1 and 6, and the transform information may be transmitted or parsed by using truncated binary code.

FIG. 15 is a diagram illustrating a method of variably adjusting the number of multiple transform selection candidates based on the position of the last non-zero coefficient in the current block and the number of non-zero coefficients in the current block using the size of the current block, according to at least one embodiment of the present disclosure. By considering both the number of non-zero coefficients in the current block and the position of the last non-zero coefficient in the current block, the number of the multiple transform selection candidates for use in the multiple transform selection may be variably adjusted. Taking into account the size of the current block, the number of the multiple transform candidates for use in the multiple transform selection may be adjusted variably based on the position of the last non-zero coefficient in the current block and the number of non-zero coefficients in the current block. Based on the size of the current block, this method may set a threshold value for the number of non-zero coefficients in the current block and a threshold value for the position of the last non-zero coefficient in the current block.

Referring to FIG. 15, lastScanPos may be the position of the last non-zero coefficient in the current block. non-zeroCoeff may be the number of non-zero coefficients in the current block. If the only non-zero coefficients in the current block are DC coefficients or if only one arbitrary AC coefficient is present, only the DCT2 transform may be used. In this case, mts_idx may be 0 and the non-DCT2 transform kernel does not need to be used. A suitable set may be selected from three sets of multiple transform selection candidates depending on the position of the last non-zero coefficient in the current block, the number of non-zero coefficients in the current block, and the size of the current block. A suitable transform may be selected from among the multiple transform candidates included in the selected set. The transform may be performed by using the selected transform. A suitable set may be selected from three sets of multiple transform selection candidates based on lastScanPos, non-zeroCoeff, and the size of the current block. The three sets of multiple transform candidates may contain one, four, and six candidates, respectively. Set1 may include a multiple transform candidate T0. Set2 may include multiple transform candidates T0, T1, T2, and T3. Set3 may include multiple transform candidates T0, T1, T2, T3, T4, and T5.

If non-zeroCoeff is between 2 and $TH_{non\text{-}zeroCoeff\_blk}[0]$ or lastScanPos is between 1 and $TH_{lastScanPos\_blk}[0]$, the set of multiple transform selection candidate, Set1, may be used. If non-zeroCoeff is between $TH_{non\text{-}zeroCoeff\_blk}[0]$ and $TH_{non\text{-}zeroCoeff\_blk}[1]$ and lastScanPos is between $TH_{lastScanPos\_blk}[0]$ and $TH_{lastScanPos\_blk}[1]$, then the set of multiple transform selection candidates, Set2, may be used. If non-zeroCoeff is between $TH_{non\text{-}zeroCoeff\_blk}[1]$ and inf or lastScanPos is between $TH_{lastScanPos\_blk}[1]$ and inf, the set of multiple transform selection candidates, Set3, may be used.

Here, $TH_{non\text{-}zeroCoeff\_blk}[0]$ and $TH_{non\text{-}zeroCoeff\_blk}[1]$ may be the first threshold value and the second threshold value of the number of non-zero coefficients in the current block, respectively. $TH_{non\text{-}zeroCoeff\_blk}[0]$ and $TH_{non\text{-}zeroCoeff\_blk}[1]$ may be set to different arbitrary values depending on the size of the current block. $TH_{lastScanPos\_blk}[0]$ and $TH_{lastScanPos\_blk}[1]$ may be the first and second threshold values of the position of the last non-zero coefficient in the current block, respectively. $TH_{lastScanPos\_blk}[0]$ and $TH_{lastScanPos\_blk}[1]$ may be set to different arbitrary values depending on the size of the current block. The six non-DCT2 transform kernels of T0 through T5 may be arbitrary transform kernels. An arbitrary number of sets of multiple transform selection candidates and an arbitrary number of threshold values may be used. The numbers of multiple transform selection candidates included in the sets of multiple transform selection candidates may also be varied to be arbitrary numbers.

If the current block utilizes a single multiple transform selection candidate, then mts_idx is 1 and no such transform information needs to be transmitted or parsed. If the current block utilizes four multiple transform selection candidates, mts_idx is a value between 1 and 4, and such transform information may be transmitted or parsed by using truncated binary code or fixed-length code. If the current block utilizes six multiple transform selection candidates, mts_idx is a value between 1 and 6, and the transform information may be transmitted or parsed by using truncated binary code.

FIG. 16 is a diagram illustrating a method of variably adjusting the number of multiple transform selection candidates under the exceptional conditions of FIG. 15, according to at least one embodiment of the present disclosure.

Referring to FIG. 16, the case of FIG. 15 where non-zeroCoeff is between 2 and $TH_{non\text{-}zeroCoeff\_blk}[0]$ and lastScanPos is between $TH_{lastScanPos\_blk}[1]$ and inf may constitute an exceptional condition with a low probability of occurrence. In FIG. 15, the case where non-zeroCoeff is between $TH_{non\text{-}zeroCoeff\_blk}[1]$ and inf and lastScanPos is between 1 and $TH_{lastScanPos\_blk}[0]$ may be an exceptional condition with a low probability of occurrence. Under these exceptional conditions, a set of multiple transform selection candidates may be selected.

In method 1, a set of multiple transform selection candidates may be selected by prioritizing the number of non-zero coefficients in the current block. If non-zeroCoeff is between 2 and $TH_{non\text{-}zeroCoeff\_blk}[0]$ and lastScanPos is between $TH_{lastScanPos\_blk}[1]$ and inf, then the set of multiple transform selection candidate, Set1, may be used. If non-zero- Coeff is between $TH_{non-zeroCoeff\_blk}[1]$ and inf and lastScan-Pos is between 1 and $TH_{lastScanPos\_blk}[0]$, then the set of multiple transform selection candidates, Set3, may be used.

In method 2, a set of multiple transform selection candidates may be selected by prioritizing the position of the last non-zero coefficient in the current block. If non-zeroCoeff is between 2 and $TH_{non-zeroCoeff\_blk}[0]$ and lastScanPos is between $TH_{lastScanPos\_blk}[1]$ and inf, then the set of multiple transform selection candidates, Set3, may be used. If non-zeroCoeff is between $TH_{non-zeroCoeff\_blk}[1]$ and inf, and lastScanPos is between 1 and $TH_{lastScanPos\_blk}[0]$, then the set of multiple transform selection candidate, Set1, may be used.

Figure 17:
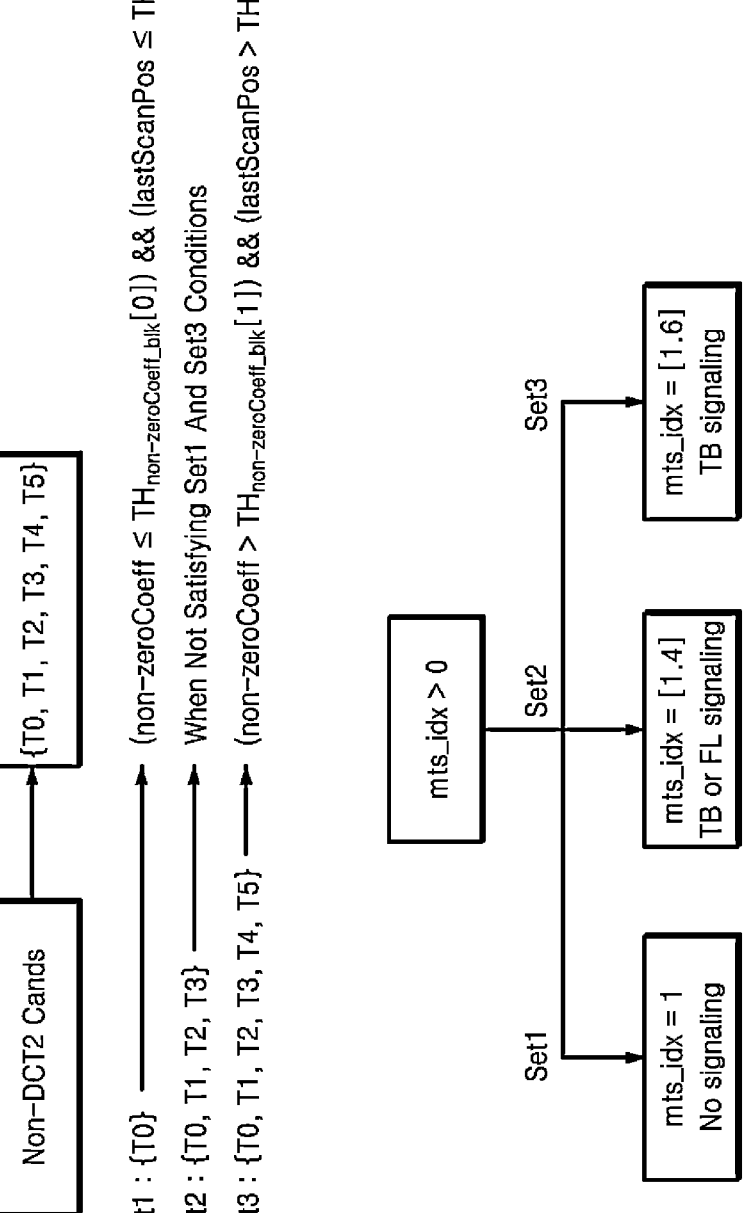
FIG. 17 is a diagram illustrating a method of variably adjusting the number of multiple transform selection candidates based on the position of the last non-zero coefficient in the current block and the number of non-zero coefficients using the size of the current block, according to yet another embodiment of the present disclosure.

FIG. 17 is a diagram illustrating a method of variably adjusting the number of multiple transform selection candidates based on the position of the last non-zero coefficient in the current block and the number of non-zero coefficients using the size of the current block, according to yet another embodiment of the present disclosure.

Referring to FIG. 17, lastScanPos may be the position of the last non-zero coefficient in the current block. non-zeroCoeff may be the number of non-zero coefficients in the current block. If the only non-zero coefficients in the current block are DC coefficients or if only one arbitrary AC coefficient is present, only the DCT2 transform may be used. In this case, mts_idx may be 0 and the non-DCT2 transform kernel does not need to be used. A suitable set may be selected from three sets of multiple transform selection candidates depending on the position of the last non-zero coefficient in the current block, the number of non-zero coefficients in the current block, and the size of the current block. A suitable transform may be selected from among the multiple transform candidates included in the selected set. The transform may be performed by using the selected transform. Based on lastScanPos, non-zeroCoeff, and the size of the current block, a suitable set may be selected from the three sets of multiple transform selection candidates. The three sets of multiple transform candidates may contain one, four, and six candidates, respectively. Set1 may include a multiple transform candidate T0. Set2 may include multiple transform candidates T0, T1, T2, and T3. Set3 may include multiple transform candidates T0, T1, T2, T3, T4, and T5.

If non-zeroCoeff is between 2 and $TH_{non-zeroCoeff\_blk}[0]$ and lastScanPos is between 1 and $TH_{lastScanPos\_blk}[0]$, the set of multiple transform selection candidate, Set1, may be used. If non-zeroCoeff is between $TH_{non-zeroCoeff}[1]$ and inf and lastScanPos is between $TH_{lastScanPos\_blk}[1]$ and inf, then the set of multiple transform selection candidates, Set3, may be used. If the aforementioned conditions for using Set1 and Set3 are not satisfied, the set of multiple transform selection candidates, Set2, may be used.

Here, $TH_{non-zeroCoeff\_blk}[0]$ and $TH_{non-zeroCoeff\_blk}[1]$ may be the first threshold value and the second threshold value of the number of non-zero coefficients in the current block, respectively. $TH_{non-zeroCoeff\_blk}[0]$ and $TH_{non-zeroCoeff\_blk}[1]$ may be set to arbitrary values depending on the size of the current block. $TH_{lastScanPos\_blk}[0]$ and $TH_{lastScanPos\_blk}[1]$ may be the first and second threshold values of the position of the last non-zero coefficient in the current block, respectively. $TH_{lastScanPos\_blk}[0]$ and $TH_{lastScanPos\_blk}[1]$ may be set to arbitrary values depending on the size of the current block. The six non-DCT2 transform kernels of T0 through T5 may be arbitrary transform kernels. An arbitrary number of sets of multiple transform selection candidates and an arbitrary number of threshold values may be used. The numbers of multiple transform selection candidates included in the sets of multiple transform selection candidates may also be varied to be arbitrary numbers.

If the current block utilizes a single multiple transform selection candidate, then mts_idx is 1 and no such transform information needs to be transmitted or parsed. If the current block utilizes four multiple transform selection candidates, mts_idx is a value between 1 and 4, and such transform information may be transmitted or parsed by using truncated binary code or fixed-length code. If the current block uses six multiple transform selection candidates, mts_idx is a value between 1 and 6, and the transform information may be transmitted or parsed by using truncated binary code.

The syntax structure of FIG. 9 may be used in the methods described in FIGS. 12 through 17. If mts_idx_skip_flag is equal to 1, mts_idx may not be transmitted or parsed. In this case, the value of mts_idx may be derived. If mts_idx_skip_flag is 0, mts_idx may be transmitted or parsed. If mts_idx_skip_flag is 1, the value of mts_idx may be derived in the following manner. Accumulated may be the number of non-zero coefficients in the current block that use multiple transform selection, the position of the last non-zero coefficient in the current block, and the value of the mts_idx used. If the mts_idx_skip_flag is 1, the number of non-zero coefficients in the current block and the position of the last non-zero coefficient in the current block may be determined. The most used mts_idx value among the accumulated mts_idx values may be derived as the mts_idx value of the current block. This method can improve coding efficiency by saving bits required to transmit or parse the mts_idx.

For example, in the methods of varying the number of multiple transform selection candidates used in the multiple transform selection described in FIGS. 10 through 17, the sets of multiple transform selection candidates are not limited to three. Any number of sets of multiple transform selection candidates may be defined and any number of corresponding threshold values may be defined. The number of multiple transform candidates included in the respective sets of multiple transform candidates may also be arbitrary. Here, the transform pairs of the multiple transform selection candidates may be determined as arbitrary transform combinations.

Figure 18:
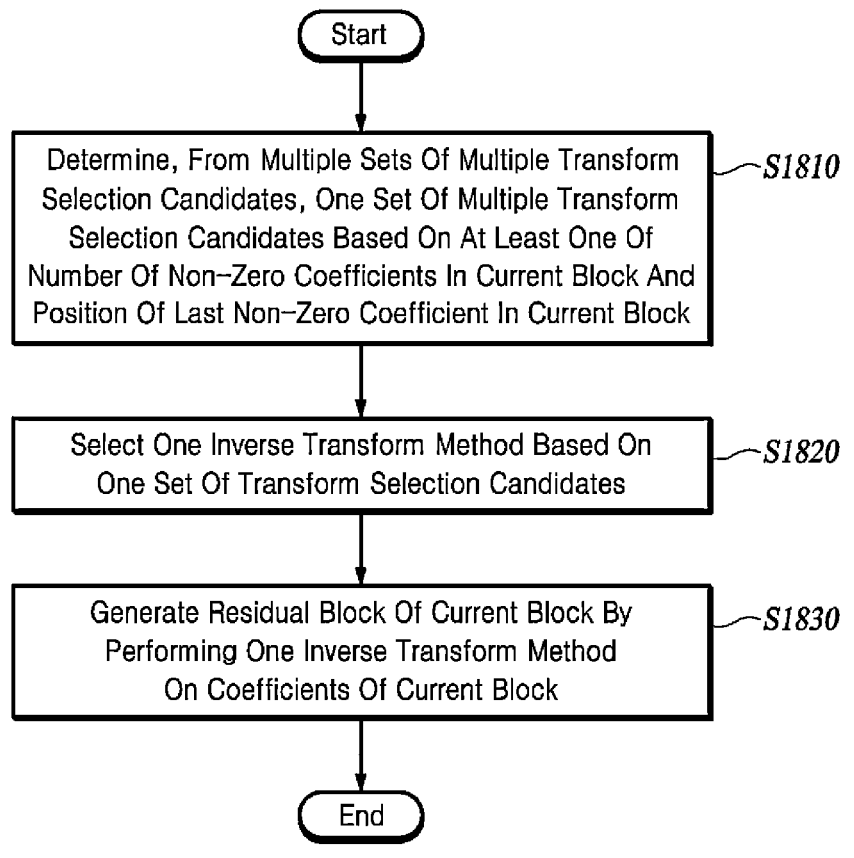
FIG. 18 is a diagram illustrating a video decoding process, according to an embodiment of the present disclosure.

FIG. 18 is a diagram illustrating a video decoding process, according to an embodiment of the present disclosure.

Referring to FIG. 18, the decoding device may determine, from multiple sets of multiple transform selection candidates, one set of multiple transform selection candidates based on at least one of the number of non-zero coefficients in the current block and the position of the last non-zero coefficient in the current block (S1810). The step of determining one set of multiple transform candidates may include a step of determining the one set of multiple transform selection candidates from the multiple sets of multiple transform selection candidates by using the position of the last non-zero coefficient in the current block and one or more threshold values. One or more threshold values may be arbitrary.

The step of determining one set of multiple transform candidates may include a step of determining the one set of multiple transform selection candidates from the multiple sets of multiple transform selection candidates by using the number of non-zero coefficients in the current block and one or more threshold values. One or more threshold values may be arbitrary. The step of determining one set of multiple transform candidates may include a step of determining the one set of multiple transform selection candidates from the multiple sets of multiple transform selection candidates by using the number of non-zero coefficients in the current block, one or more threshold values, and size of the current block. One or more threshold values may be set to arbitrary values based on the size of the current block.

The step of determining one set of multiple transform selection candidates may include a step of determining the one set of multiple transform selection candidates from the multiple sets of multiple transform selection candidates by using the position of the last non-zero coefficient in the current block, the number of the non-zero coefficients in the current block, one or more threshold values of the position of the last non-zero coefficient in the current block, and one or more threshold values of the number of the non-zero coefficients in the current block. The one or more threshold values of the position of the last non-zero coefficient in the current block may be arbitrary. The one or more threshold values of the number of non-zero coefficients in the current block may be arbitrary.

The step of determining one set of multiple transform selection candidates may include a step of determining the one set of multiple transform selection candidates from the multiple sets of multiple transform selection candidates by using the position of the last non-zero coefficient in the current block, the number of the non-zero coefficients in the current block, size of the current block, one or more threshold values of the position of the last non-zero coefficient in the current block, and one or more threshold values of the number of the non-zero coefficients in the current block. One or more threshold values of the position of the last non-zero coefficient in the current block may be set to arbitrary values based on the size of the current block. The one or more threshold values of the number of the non-zero coefficients in the current block may be set to arbitrary values based on the size of the current block.

The decoding device may select one inverse transform method based on the one set of multiple transform selection candidates (S1820). The decoding device may perform the one inverse transform method on the coefficients of the current block to generate a residual block of the current block (S1830). One or more candidates in the multiple sets of multiple transform selection candidates may be equivalent to a non-DCT2 transform method. The number of the multiple sets of multiple transform selection candidates may be arbitrary. The number of candidates in the multiple sets of multiple transform selection candidates may be arbitrary.

Figure 19:
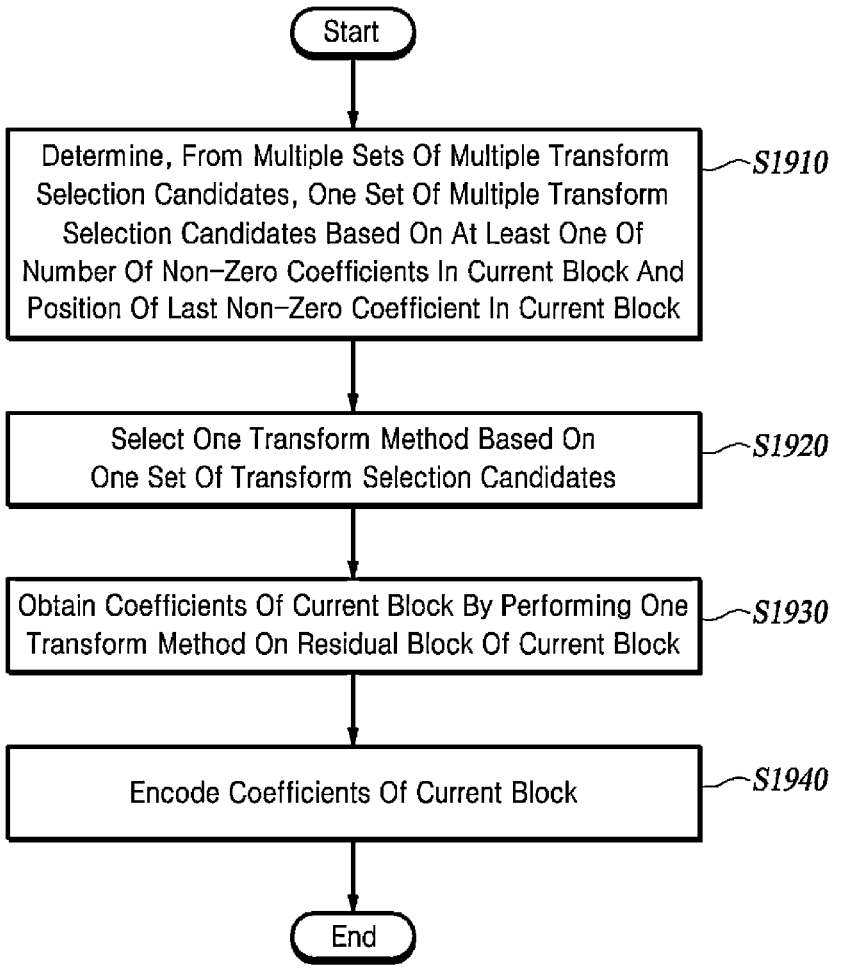
FIG. 19 is a diagram illustrating a video encoding process, according to an embodiment of the present disclosure.

FIG. 19 is a diagram illustrating a video encoding process, according to an embodiment of the present disclosure.

Referring to FIG. 19, the encoding device may determine, from multiple sets of multiple transform selection candidates, one set of multiple transform selection candidates based on at least one of the number of non-zero coefficients in a current block and a position of a last non-zero coefficient in the current block (S1910). The step of determining one set of multiple transform candidates may include a step of determining the one set of multiple transform selection candidates from the multiple sets of multiple transform selection candidates by using the position of the last non-zero coefficient in the current block and one or more threshold values. One or more threshold values may be arbitrary.

The step of determining one set of multiple transform candidates may include a step of determining the one set of multiple transform selection candidates from the multiple sets of multiple transform selection candidates by using the number of non-zero coefficients in the current block and one or more threshold values. One or more threshold values may be arbitrary. The step of determining one set of multiple transform candidates may include a step of determining the one set of multiple transform selection candidates from the multiple sets of multiple transform selection candidates by using the number of non-zero coefficients in the current block, one or more threshold values, and size of the current block. One or more threshold values may be set to arbitrary values based on the size of the current block.

The step of determining one set of multiple transform candidates may include a step of determining the one set of multiple transform selection candidates from the multiple sets of multiple transform selection candidates by using the position of the last non-zero coefficient in the current block, the number of the non-zero coefficients in the current block, one or more threshold values of the position of the last non-zero coefficient in the current block, and one or more threshold values of the number of the non-zero coefficients in the current block. The one or more threshold values of the position of the last non-zero coefficient in the current block may be arbitrary. The one or more threshold values of the number of the non-zero coefficients in the current block may be arbitrary.

The step of determining one set of multiple transform candidates may include a step of determining the one set of multiple transform selection candidates from the multiple sets of multiple transform selection candidates by using the position of the last non-zero coefficient in the current block, the number of the non-zero coefficients in the current block, size of the current block, one or more threshold values of the position of the last non-zero coefficient in the current block, and one or more threshold values of the number of the non-zero coefficients in the current block. One or more threshold values of the position of the last non-zero coefficient in the current block may be set to arbitrary values based on the size of the current block. The one or more threshold values of the number of the non-zero coefficients in the current block may be set to arbitrary values based on the size of the current block.

The encoding device may select one transform method based on the one set of multiple transform selection candidates (S1920). The encoding device may perform the one transform method on the residual block of the current block to obtain the coefficients of the current block (S1930). The encoding device may encode the coefficients of the current block (S1940). One or more candidates in the multiple sets of multiple transform selection candidates may be equivalent to a non-DCT2 transform method. The number of the multiple sets of multiple transform selection candidates may be arbitrary. The number of candidates in the multiple sets of multiple transform selection candidates may be arbitrary.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

What is claimed is:

1. A video decoding method, comprising:
selecting, from multiple sets of multiple transform selection candidates, one set of multiple transform selection candidates based on non-zero coefficients in a current block;
selecting one inverse transform method based on the one set of multiple transform selection candidates; and
generating a residual block of the current block by performing the one inverse transform method on coefficients of the current block,
wherein the multiple sets of multiple transform selection candidates include a first set, a second set, and a third set which respectively have a first number of multiple transform selection candidates, a second number of multiple transform selection candidates, and a third number of multiple transform selection candidates,
wherein selecting the one set of multiple transform selection candidates comprises:
comparing a value derived from the non-zero coefficients in the current block with a first threshold and a second threshold greater than the first threshold;
setting the one set of multiple transform selection candidates as the first set when the value is less than the first threshold;
setting the one set of multiple transform selection candidates as the second set when the value is greater than the first threshold and less than the second threshold; and
setting the one set of multiple transform selection candidates as the third set when the value is greater than the second threshold.

2. The video decoding method of claim 1, wherein the first number is less than the second number, and the second number is less than the third number.

3. The video decoding method of claim 2, wherein the first number is one.

4. The video decoding method of claim 2, wherein the second number is four.

5. The video decoding method of claim 2, wherein the third number is six.

6. A video encoding method, comprising:
selecting, from multiple sets of multiple transform selection candidates, one set of multiple transform selection candidates based on non-zero coefficients in a current block;
selecting one transform method based on the one set of multiple transform selection candidates;
obtaining coefficients of the current block by performing the one transform method on a residual block of the current block; and
encoding the coefficients of the current block,
wherein the multiple sets of multiple transform selection candidates include a first set, a second set, and a third set which respectively have a first number of multiple transform selection candidates, a second number of multiple transform selection candidates, and a third number of multiple transform selection candidates,
wherein selecting the one set of multiple transform selection candidates comprises:
comparing a value derived from the non-zero coefficients in the current block with a first threshold and a second threshold greater than the first threshold;
setting the one set of multiple transform selection candidates as the first set when the value is less than the first threshold;
setting the one set of multiple transform selection candidates as the second set when the value is greater than the first threshold and less than the second threshold; and
setting the one set of multiple transform selection candidates as the third set when the value is greater than the second threshold.

7. The video encoding method of claim 6, wherein the first number is less than the second number, and the second number is less than the third number.

8. The video encoding method of claim 6, wherein the first number is one.

9. The video encoding method of claim 6, wherein the second number is four.

10. The video encoding method of claim 9, wherein the third number is six.

11. A method for transmitting a bitstream associated with video data, the method comprising:
generating the bitstream by encoding the video data; and
transmitting the bitstream to a video decoding apparatus,
wherein generating the bitstream comprises:
selecting, from multiple sets of multiple transform selection candidates, one set of multiple transform selection candidates based on non-zero coefficients in a current block;
selecting one transform method based on the one set of multiple transform selection candidates;
obtaining coefficients of the current block by performing the one transform method on a residual block of the current block; and
encoding the coefficients of the current block,
wherein the multiple sets of multiple transform selection candidates include a first set, a second set, and a third set which respectively have a first number of multiple transform selection candidates, a second number of multiple transform selection candidates, and a third number of multiple transform selection candidates,
wherein selecting the one set of multiple transform selection candidates comprises:
comparing a value derived from the non-zero coefficients in the current block with a first threshold and a second threshold greater than the first threshold;

setting the one set of multiple transform selection candidates as the first set when the value is less than the first threshold;

setting the one set of multiple transform selection candidates as the second set when the value is greater than the first threshold and less than the second threshold; and setting the one set of multiple transform selection candidates as the third set when the value is greater than the second threshold.

* * * * *